Patented Mar. 16, 1954

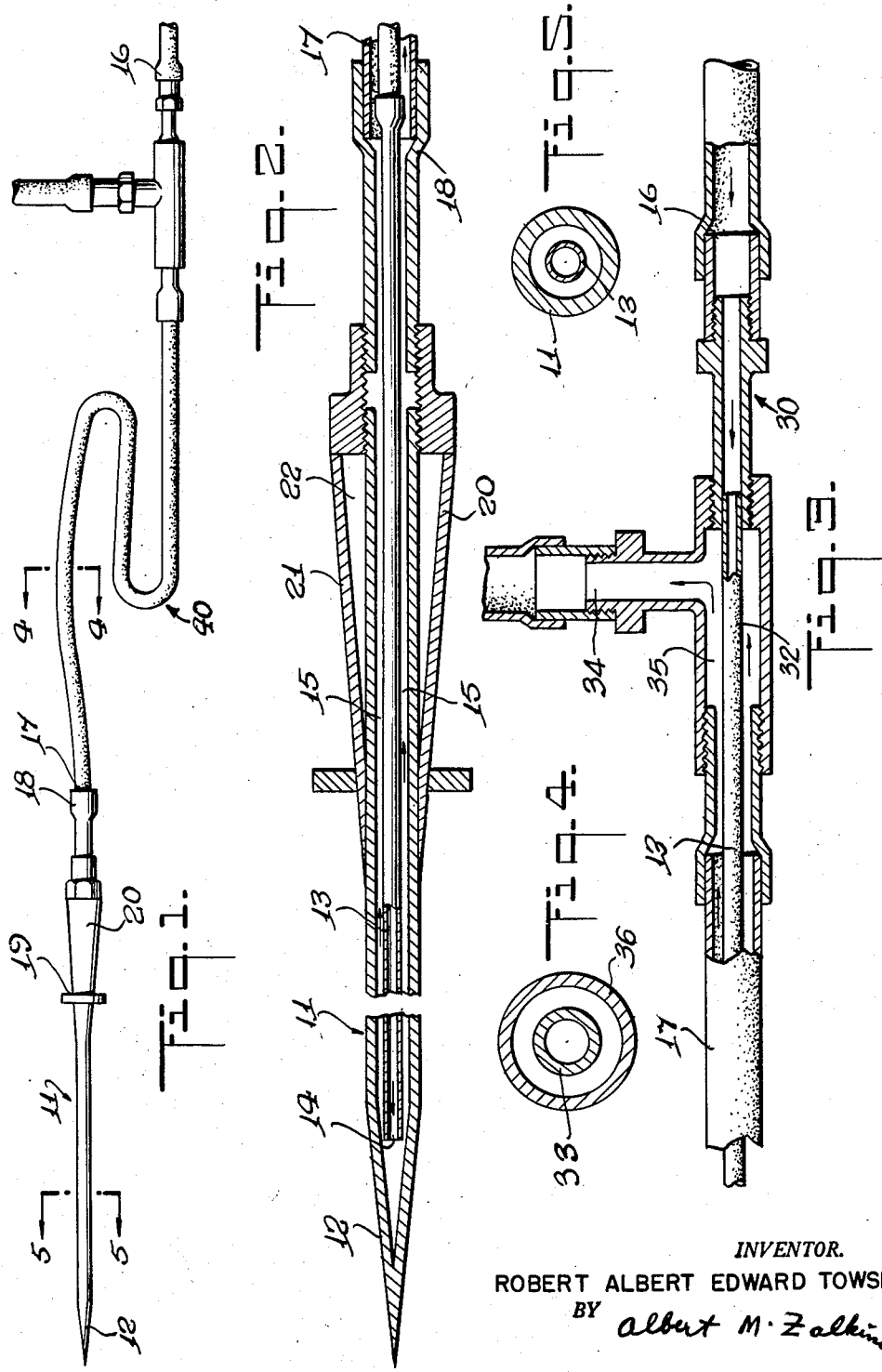

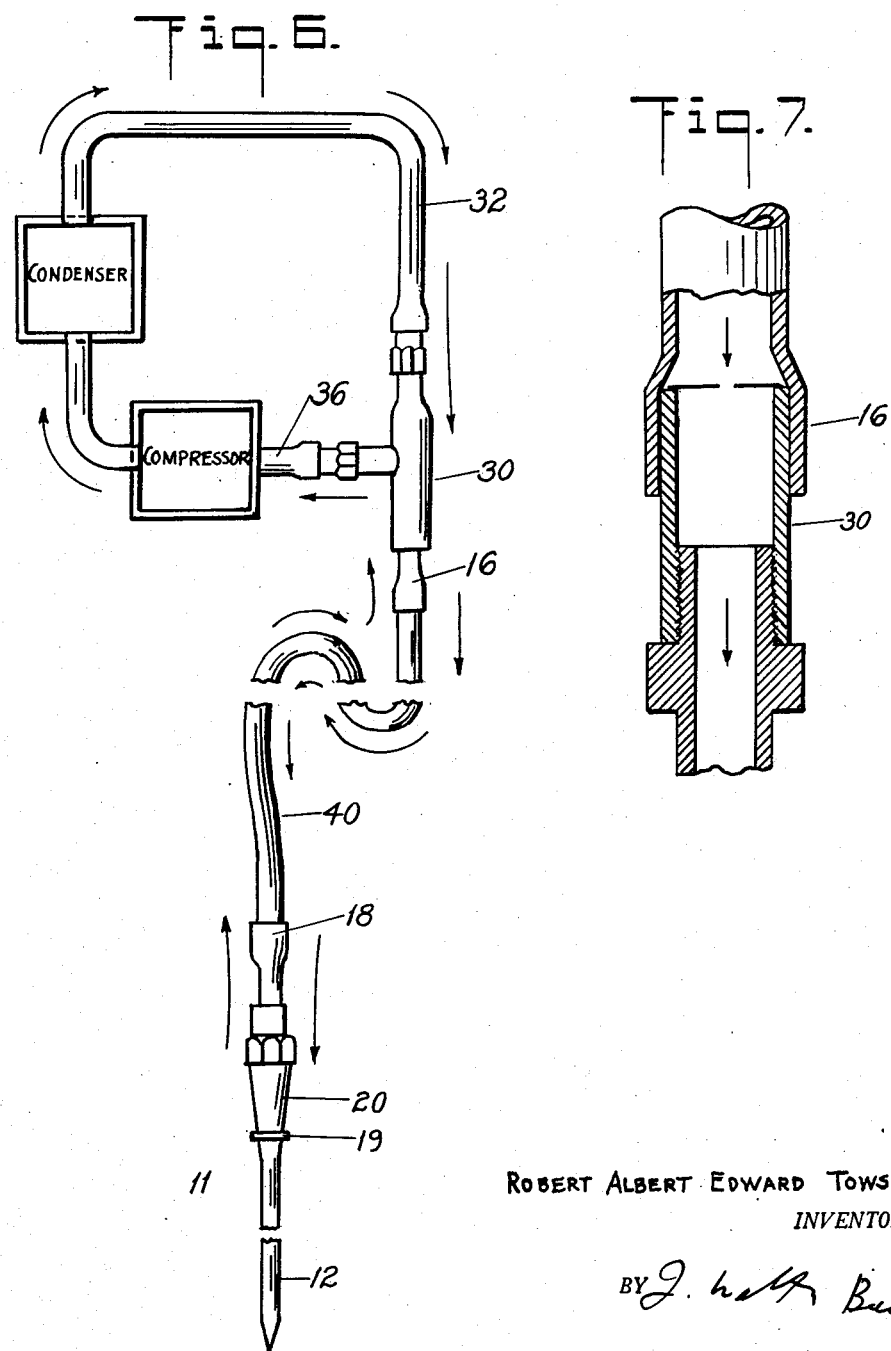

2,672,032

UNITED STATES PATENT OFFICE 2,672,032

CARCASS FREEZING DEVICE

Robert Albert Edward Towse, Brooklyn, N. Y.

Application October 19, 1951, Serial No. 252,130

4 Claims. (Cl. 62—126)

This invention relates to a carcass freezing device and is particularly applicable to the process of quick freezing beef, pork, lamb, etc. immediately after the animal is killed for prevention of decomposition.

It was discovered early in the use of the above-mentioned process that certain blood vessels in the rump of the aforementioned animals would remain warm long after the other parts of the carcass would be frozen. This would result in the growth of bacteria and would cause decomposition of the meat from the inside even though the carcass was frozen hard on the outside. For this reason a process was devised wherein chilled brine was conducted through a tube in a hollow rod and the tube inserted into the blood vessels in the rump of the animal, thereby chilling its flesh from the inside. While this process stopped the decomposition that had been previously encountered it had the great disadvantage of doing more harm than good if the hollow rod would become punctured for some reason. If this happened the release of brine in the carcass effectively ruined it completely.

This invention seeks to overcome the handicap mentioned above by using an expanding refrigerant which is a gas at ordinary temperatures in order to chill a hollow rod to be inserted into the carcass. By the use of this invention it can be easily seen that if a leak is detected the rod can be removed quickly and the refrigerant which has leaked into the carcass will vaporize without any trouble. This is the principal advantage of the present invention over the conventional process.

It is a further object of this invention to provide a carcass freezing device wherein the temperature of the chilling rod can be easily controlled.

It is a further object of this invention to provide a carcass freezing device which will be less bulky, costly or difficult to operate as those used heretofore.

The invention will be further described by reference to the drawings which are made a part of this specification.

Fig. 1 is a front perspective view of the invention with the conventional refrigerator motor and compressor device not shown.

Fig. 2 is a sectional view of the rod member which is inserted into a carcass to aid in chilling same.

Fig. 3 is a front view, partly in section, showing the means whereby the refrigerant is led into the rod member.

Fig. 4 is a sectional view taken on lines 4—4 of Fig. 1.

Fig. 5 is a sectional view taken on lines 5—5 of Fig. 1.

Fig. 6 is a view similar to Fig. 1 showing the circulation of the refrigerant in the device.

Fig. 7 is an enlarged detail view of a portion of Fig. 3 showing the valve member within the refrigerant controlling member.

There are provided rod member 11 which is adapted to be inserted into the carcass to be chilled. Rod member 11 is preferably pointed at the lower end 12 so that it may more easily pierce the blood vessels into which it is to be inserted. Tube member 13 is disposed within rod member 11 and is open at its lower end 14. Tube member 13 does not touch the sides of rod member 11 so that a space 15 is present between tube member 13 and rod member 11. A refrigerant controlling member is located at a distance from the upper end 18 of rod member 11 and is secured to rod member 11 by coupling member 40. Coupling member 40 is flexible and consists of two concentric tubes. Inner tube 33 is secured to tube member 13 and to tube member 32 which is disposed within refrigerant controlling member 30. Refrigerant controlling member 30 is also formed with a casing which is hollow and tube member 32 is spaced from the casing 31 so that space 35 is provided. Outer tube member 34 of coupling member 30 communicates with space 35 and space 15. Valve 16 is provided in refrigerant controlling member 30 to release the pressure of the refrigerant gas and to produce a cooling effect. Tube 36 communicates with space 35 of refrigerant controlling member 30.

In the operation of this device the refrigerant (which has become a liquid by means of cooling and compressing) is adapted to flow to tube member 32. When it reaches valve member 16 at the upper end of tube member 32 the pressure produced causes valve member 16 to release the pressure of the refrigerant. The refrigerant then becomes a gas and expands through tube 32 tube 33 of coupling member 40, tube member 14, space 15 of rod member 11, tube member 34 of coupling member 40, space 35 of refrigerant controlling member 30 and tube 36 of refrigerant controlling member 30. After leaving tube 36 the gas is recompressed and recooled and then recirculated through valve member 16 etc.

Because of the construction of the device the maximum cooling effect is produced at the pointed end 12 of rod member 11 since the spaces of rod member 11 and refrigerant controlling member 30 as well as the outer tube 34 of coupling member 40 produce an insulating effect. An expanding refrigerant is adapted to flow through tube member 13. The refrigerant is then led into a conventional compressor device (not shown) driven by a conventional motor (not shown), the refrigerant is recompressed, is cooled to room temperature by a conventional condensing device (not shown) and then is led into tube member 13 through valve 16 to repeat the cycle.

With the conventional materials which are preferred in this invention for refrigerating purposes, such as Freon, carbon dioxide, etc. compressing of the refrigerant material and subsequent cooling to room temperature will produce a liquid under pressure. When this liquid is led into tube 13 through valve 16, the release of pressure causes the liquid to turn into a gas and causes a cooling effect. This effect continues as the gas circulates through tube 13, space 15 but the effect is practically eliminated by the time the gas enters tube 17. Since, however, the process is a continuous one, and the motor, compressor, and condenser are continually running while the device is in operation, rod member 11 is constantly being cooled. The temperature of rod member 11 can be easily controlled in a variety of ways. The rate of the flow of refrigerant can be controlled by opening or closing valve member 16 to the proper degree. It is obvious that the slower the refrigerant flows in the tubes the less the cooling effect will be.

The temperature may be also controlled by varying the speed of the motor which drives the compressor. The faster the motor revolves the greater will be the cooling effect. Finally the temperature can be controlled by the conventional thermostatic device used in the conventional household refrigerator in which the motor and compressor are operated only intermittently as required to maintain a particular temperature.

While not strictly necessary for the practice of this invention rod member 11 may bear a shield member 19 about midway on its outer surface so that it cannot be inserted too far into the carcass to be chilled. In addition the upper portion of rod member 11 may be insulated so that it can be handled without protection. In the preferred modification of this invention there are provided side members 20 and 21 surrounding a dead air space 22.

It is preferable to make rod member 11 out of stainless steel so that it will not corrode in use but other suitable metals such as steel and brass can be used provided precautions against corrosion are taken. Tubes 13 and 17 may be made of similar materials.

The foregoing specific embodiments of this invention are for illustrative purposes and for purposes of example only. Various changes and modifications can obviously be made within the spirit and scope of the invention.

I claim:

1. A carcass freezing device comprising a pointed rod member adapted to pierce the body wall of the animal to be treated, the sides of said rod member defining a cavity in the interior thereof, a tube member open at its lower end disposed within said cavity in said rod member and spaced from the sides thereof, a refrigerant controlling member disposed above said rod member, the sides of said refrigerant controlling member defining a cavity in the interior thereof, an inlet tube member spaced from the sides of said cavity within said refrigerant controlling member, an outlet tube member communicating with said cavity in said refrigerant controlling member, a coupling member connecting said rod member with said refrigerant controlling member, said coupling member being formed with two tube members, one of said tube members operatively connecting said tube member within said rod member with said tube member within said refrigerant controlling member, the other tube member operatively connecting said cavity in said rod member with said cavity in said refrigerant controlling member, a valve member disposed at the upper end of said inlet tube member of said refrigerant controlling member so that said refrigerant gas is adapted to expand into said rod member, thereby cooling the same, thence is removed from said device after expansion, and thence is recooled recompressed, and recirculated through said rod member.

2. A carcass freezing device as described in claim 1 wherein said coupling member is made of flexible material.

3. A carcass freezing device as described in claim 2 wherein said coupling member is formed with two concentric tubes, one within another.

4. A carcass freezing device as described in claim 3 including an insulating member upon said rod member.

ROBERT ALBERT EDWARD TOWSE.

References Cited in the file of this patent

UNITED STATES PATENTS

| Number | Name | Date |
|---|---|---|
| 1,780,267 | Malone | Nov. 4, 1930 |
| 2,258,173 | Bratek et al. | Oct. 7, 1941 |
| 2,261,808 | Morris | Nov. 4, 1941 |
| 2,267,789 | Conn | Dec. 30, 1941 |
| 2,314,317 | Walter | Mar. 16, 1943 |
| 2,355,145 | Carlson | Aug. 8, 1944 |
| 2,402,121 | Brewster et al. | June 18, 1946 |
| 2,527,782 | Williams | Oct. 31, 1950 |
| 2,585,240 | Grow | Feb. 12, 1952 |